United States Patent
Trusov et al.

(10) Patent No.: US 9,810,535 B2
(45) Date of Patent: Nov. 7, 2017

(54) VIBRATING-MASS GYROSCOPE SYSTEMS AND METHOD

(71) Applicants: Alexander Trusov, Studio City, CA (US); David M. Rozelle, Woodland Hills, CA (US)

(72) Inventors: Alexander Trusov, Studio City, CA (US); David M. Rozelle, Woodland Hills, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 224 days.

(21) Appl. No.: 14/618,747

(22) Filed: Feb. 10, 2015

(65) Prior Publication Data

US 2016/0231118 A1    Aug. 11, 2016

(51) Int. Cl.
*G01C 19/5726* (2012.01)
*G01C 25/00* (2006.01)
(Continued)

(52) U.S. Cl.
CPC ....... *G01C 19/5726* (2013.01); *G01C 19/574* (2013.01); *G01C 19/5755* (2013.01); *G01C 25/00* (2013.01); *G01C 25/005* (2013.01)

(58) Field of Classification Search
CPC .............. G01C 19/5726; G01C 19/574; G01C 19/5755; G01C 25/00; G01C 25/005
See application file for complete search history.

(56) References Cited

U.S. PATENT DOCUMENTS

| 6,067,858 A * | 5/2000 | Clark ................. G01C 19/5719 |
| | | 73/504.16 |
| 2004/0112134 A1* | 6/2004 | Beitia ................ G01C 19/5684 |
| | | 73/504.12 |

(Continued)

FOREIGN PATENT DOCUMENTS

| EP | 1 873 489 A1 | 1/2008 |
| EP | 2977722 A1 | 1/2016 |

OTHER PUBLICATIONS

"System Architecture for Mode-Matching a MEMS Gyroscope" by Henry Wu, Jun. 2009, Massachusetts Institute of Technology.*

(Continued)

*Primary Examiner* — Paul West
*Assistant Examiner* — Xin Zhong
(74) *Attorney, Agent, or Firm* — Tarolli, Sundheim, Covell & Tummino LLP

(57) ABSTRACT

One embodiment of the invention includes a vibrating-mass gyroscope system. The system includes a sensor system comprising a vibrating-mass and a plurality of electrodes coupled to the vibrating-mass that are configured to facilitate in-plane motion of the vibrating-mass. The system also includes a gyroscope controller configured to generate a drive signal that is provided to a first set of the plurality of electrodes to provide an in-plane periodic oscillatory motion of the vibrating-mass along a drive axis, to generate a force-rebalance signal that is provided to a second set of the plurality of electrodes to calculate a rotation of the vibrating-mass gyroscope system about an input axis, and to generate a quadrature signal that is provided to a third set of the plurality of electrodes to substantially mitigate quadrature effects associated with the vibrating-mass.

12 Claims, 3 Drawing Sheets

(51) Int. Cl.
*G01C 19/574* (2012.01)
*G01C 19/5755* (2012.01)

(56) References Cited

U.S. PATENT DOCUMENTS

| | | | |
|---|---|---|---|
| 2007/0144255 A1 | 6/2007 | Handrich et al. | |
| 2008/0000296 A1* | 1/2008 | Johnson | G01C 19/5719 73/514.18 |
| 2009/0255336 A1 | 10/2009 | Horning et al. | |
| 2010/0071465 A1* | 3/2010 | Stewart | G01C 19/5719 73/504.02 |
| 2010/0313657 A1* | 12/2010 | Trusov | G01C 19/5747 73/504.16 |
| 2013/0055787 A1 | 3/2013 | Geiger et al. | |

OTHER PUBLICATIONS

Extended European Search Report for corresponding EP 16 15 4918 dated Jul. 11, 2016.
Office Action issued Feb. 7, 2017 for corresponding JP 2016-022728; translation provided.
Article 84 issued May 26, 2017 for corresponding EP 16 154 918.3.

* cited by examiner

VIBRATING-MASS GYROSCOPE SYSTEMS AND METHOD

This invention was made with Government support under Federal Government Contract No. N66001-12-C-4035. The Government has certain rights in this invention.

TECHNICAL FIELD

This disclosure relates generally to sensor systems, and specifically to a vibrating-mass gyroscope systems and method.

BACKGROUND

There are a number different types of vibrating-mass gyroscope systems that can be configured to calculate rotation about a sensitive (e.g., input) axis. One type of gyroscope is a Coriolis vibratory gyroscope (CVG). One example of a CVG is a tuning fork gyroscope in which two masses (e.g. tines) can vibrate in plane along a drive axis. In response to an applied angular rate about an input axis parallel to the tines of the tuning fork, Coriolis forces cause the tines to vibrate out of plane along a sense axis (e.g., 90° relative to a drive axis). The amplitude of the out-of-plane motion in open loop instruments or the force required to rebalance and null the out-of-plane motion in closed-loop instruments can correspond to a measure of the angular rate applied about the input axis.

SUMMARY

One embodiment of the invention includes a vibrating-mass gyroscope system. The system includes a sensor system comprising a vibrating-mass and a plurality of electrodes coupled to the vibrating-mass that are configured to facilitate in-plane motion of the vibrating-mass. The system also includes a gyroscope controller configured to generate a drive signal that is provided to a first set of the plurality of electrodes to provide an in-plane periodic oscillatory motion of the vibrating-mass along a drive axis, to generate a force-rebalance signal that is provided to a second set of the plurality of electrodes to calculate a rotation of the vibrating-mass gyroscope system about an input axis, and to generate a quadrature signal that is provided to a third set of the plurality of electrodes to substantially mitigate quadrature effects associated with the vibrating-mass.

Another embodiment of the invention includes a method for calculating rotation about an input axis in a vibrating-mass gyroscope system. The method includes monitoring a drive pickoff signal associated with a set of drive electrode shuttles that is coupled to a vibrating-mass and providing a drive signal to the set of drive electrode shuttles to provide an in-plane periodic oscillatory motion of the vibrating-mass. The method also includes monitoring a force-rebalance pickoff signal associated with a set of sense electrode shuttles that is coupled to the vibrating-mass and providing a force-rebalance signal to the set of sense electrode shuttles based on the force-rebalance pickoff signal to calculate a rotation of the vibrating-mass gyroscope system about the input axis. The method further includes providing a quadrature signal to a set of quadrature electrode shuttles that is coupled to the vibrating-mass to substantially mitigate quadrature effects.

Another embodiment of the invention includes a vibrating-mass gyroscope system. The system includes a sensor system comprising a plurality of vibrating-masses and a respective plurality of sets of electrodes respectively coupled to each of the plurality of vibrating-masses. Each of the plurality of sets of substantially planar vibrating masses can be configured to facilitate in-plane motion of a respective one of the plurality of vibrating-masses. The system further includes a gyroscope controller configured to generate drive signals that are provided to drive electrodes of each of the plurality of sets of electrodes to provide an in-plane periodic oscillatory motion of the respective plurality of vibrating-masses along a drive axis, to generate a force-rebalance signals that are provided to sense electrodes of each of the plurality of sets of electrodes to calculate a rotation of the vibrating-mass gyroscope system about an input axis, and to generate quadrature signals that are provided to quadrature electrodes of each of the plurality of sets of electrodes to substantially mitigate quadrature effects associated with the respective plurality of vibrating-masses.

DETAILED DESCRIPTION

Figure 1:
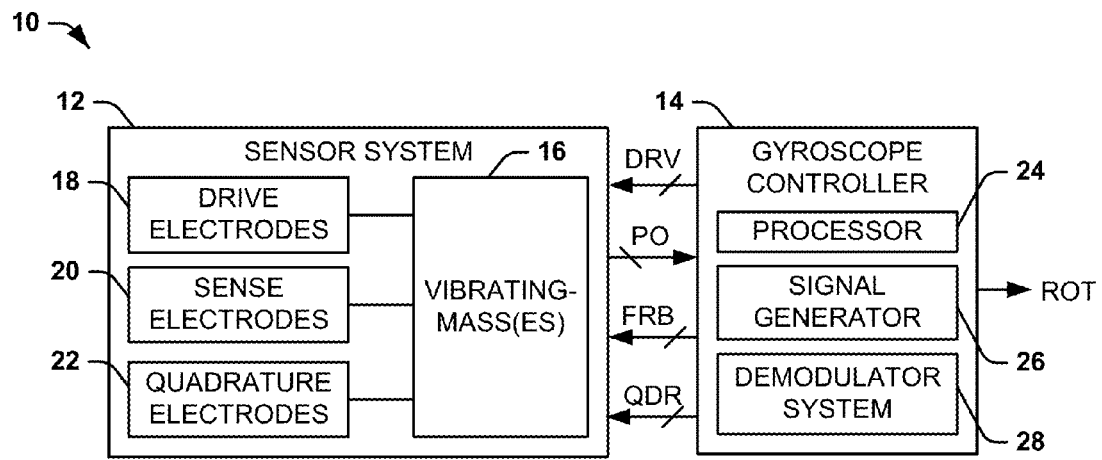
FIG. 1 illustrates an example of a vibrating-mass gyroscope system.

This disclosure relates generally to sensor systems, and specifically to a vibrating-mass gyroscope systems and method. The vibrating-mass gyroscope system includes a sensor system and a gyroscope controller. The sensor system can include at least one vibrating-mass that can be arranged as a substantially planar vibrating-mass that can have an octagonal shape, for example. The vibrating-mass(es) can include a set of drive electrodes, a set of sense electrodes, and a set of quadrature electrodes that can be implemented to provide forces, and thus in-plane motion, of the vibrating mass(es). As an example, the respective sets of drive electrodes, sense electrodes, and quadrature electrodes can be associated with electrode shuttles that are coupled to the vibrating mass(es) to provide the respective forces and in-plane motion of the vibrating mass(es).

The gyroscope controller can be configured to generate a drive signal, a force-rebalance signal, and at least one quadrature signal that are provided to the drive electrodes, the sense electrodes, and the quadrature electrodes, respectively. As an example, the drive electrode shuttles can be arranged opposite each other with respect to the vibrating mass(es) to provide in-plane periodic motion along a drive axis in response to drive signals applied to the drive electrode shuttles. The drive signal can thus provide an electrostatic force that induces an in-plane periodic oscillatory motion of the vibrating-mass(es), such as at a frequency that is approximately equal to a resonant frequency of a vibrating-mass spring system associated with the drive electrode shuttles that are coupled to the housing. As an example, the in-plane periodic oscillatory motion can be 180° out-of-phase with respect to a given pair of vibrating-masses.

The sense electrode shuttles can be arranged opposite each other with respect to the vibrating mass(es) to provide force-rebalance along a sense axis orthogonal to the drive axis in response to force rebalance signals applied to the sense electrode shuttles. The force-rebalance signal can likewise provide an electrostatic force to provide a force-rebalance of the vibrating-mass(es) in response to rotation of the sensor system about an input axis. A magnitude of the force-rebalance signal, and thus the electrostatic force, that is required to maintain the vibrating-mass(es) at a null position of a pickoff along a sense axis can correspond to a combination of a rate of rotation of the sensor system about the input axis. Therefore, the magnitude of the force-rebalance signal can be implemented by the gyroscope controller (e.g., an associated inertial sensor processor) to calculate the angular rotation of the sensor system about the input axis.

The quadrature electrodes are configured to receive a quadrature signal to generate an electrostatic force to substantially mitigate quadrature effects in the calculation of the rate of rotation of the sensor system, such as resulting from a mismatch between the principle elastic axes of the vibrating mass(es). The quadrature electrodes can be arranged as a first pair of quadrature electrode shuttles arranged opposite each other with respect to the vibrating mass(es) and which receive a first quadrature signal to provide opposing quadrature forces along a first quadrature axis that is 45° with respect to the drive and sense axes. The quadrature electrodes can also include a second pair of quadrature electrode shuttles that are arranged opposite each other with respect to the vibrating mass(es) and which receive a second quadrature signal to provide opposing quadrature forces along a second quadrature axis that is orthogonal with respect to the first quadrature axis. The quadrature signal(s) can be DC signal(s) having an amplitude that is predetermined, such as from fabrication/testing or from a feedback system that is configured to determine the quadrature effects based on the frequency of the in-plane motion of the vibrating mass(es). Therefore, the quadrature effects can be substantially mitigated to provide for a more accurate calculation of the rate of rotation of the vibrating mass sensor system.

FIG. 1 illustrates an example of a vibrating-mass gyroscope system 10. The vibrating-mass gyroscope system 10 can be implemented in any of a variety of applications with which accurate measurement of rotation may be necessary, such as aerospace and nautical navigation. The vibrating-mass gyroscope system 10 includes a sensor system 12 and a gyroscope controller 14.

The sensor system 12 includes at least one vibrating-mass 16 that can be arranged as a substantially planar inertial mass. As an example, the vibrating-mass(es) 16 can be arranged as an even-number quantity (e.g., four) of vibrating-masses. For example, the vibrating-mass(es) 16 can be fabricated as a layer of silicon, and can be fabricated in a shape to allow for in-plane movement about four separate axes that are separated by approximately 45°, such as in an octagonal shape. In the example of FIG. 1, the sensor system 12 can include one or more sets of drive electrodes 18, one or more sets of sense electrodes 20, and one or more sets of quadrature electrodes 22 that can each be coupled to a respective one of the vibrating-mass(es) 16, such that each of the vibrating mass(es) 16 can be associated with a respective set of each of the drive electrodes 18, sense electrodes 20, and quadrature electrodes 22. As an example, the sets of drive electrodes 18, sense electrodes 20, and quadrature electrodes 22 can be configured as electrode shuttles that are arranged at a periphery of the vibrating mass(es) 16 to provide for in-plane movement of the vibrating mass(es) 16. For example, the sets of drive electrodes 18, sense electrodes 20, and quadrature electrodes 22 can each include capacitively coupled electrode pairs that are configured to generate an attractive electrostatic force with respect to each other to move the vibrating mass(es) 16 with respect to a stationary housing (e.g., including a portion of the sets drive electrodes 18, sense electrodes 20, and quadrature electrodes 22).

The gyroscope controller 14 is configured to receive pickoff signals PO that can collectively be associated with the drive electrodes 18 and the sense electrodes 20. The gyroscope controller 14 can also be configured to generate drive signals DRV that are provided to the set of drive electrodes 18 to generate electrostatic force to provide an in-plane periodic oscillatory motion of the vibrating-mass(es) 16 along a drive axis, such as in response to drive pickoff signals PO. For example, the drive signals DRV can have a frequency that is approximately equal to a resonant frequency associated with one or more springs that coupled drive electrode shuttles that include the drive electrodes 18 and which are coupled to the vibrating-mass(es) 16. As an example, in the example of plural vibrating-masses 16, the in-plane periodic oscillatory motion can be provided at 180° out-of-phase with respect to each given pair of vibrating-masses 16 to provide counter-balanced motion of the vibrating-mass(es) 16. The gyroscope controller 14 is also configured to generate force-rebalance signals FRB that are provided to at least one of the sets of sense electrodes 20 to generate electrostatic force along a sense axis that is orthogonal with respect to the drive axis to null the sense pickoff and the motion of the vibrating-mass(es) 16 in response to rotation of the sensor system 12 about an input axis, such as in response to sense pickoff signals PO. For example, the force-rebalance signals FRB can have a frequency that is approximately equal to the frequency of the drive signals DRV (e.g., approximately equal to the resonant frequency).

The drive signals DRV and the force-rebalance signals FRB can be generated at an amplitude that is based on demodulated pickoff signal(s), demonstrated in the example of FIG. 1 as signals PO. The demodulated sense pickoff signals PO can have a frequency that is significantly greater than the frequency of the force-rebalance signals FRB (e.g., an order of magnitude or greater). Therefore, rotation of the sensor system 12 about the input axis can result in motion of the vibrating-mass(es) 16 orthogonally with respect to the in-plane periodic oscillatory motion associated with the drive electrodes 18. Accordingly, the electrostatic force that is generated by the sense electrodes 20 in response to the force-rebalance signals FRB can force the vibrating-mass (es) 16 to be maintained at a null position along the sense axis. As described herein, the term "null position" corresponds to a position of the vibrating-mass(es) 16 along the sense axis corresponding to an approximate zero value associated with the demodulated pickoff signal(s).

The gyroscope controller 14 includes a processor 24, a signal generator 26, and a demodulator system 28. The signal generator 26 is configured to generate the drive signals DRV that are provided to the drive electrodes 18, the force-rebalance signals FRB that are provided to the sense electrodes 20, and quadrature signals QDR that are provided to the quadrature electrodes 22. In response to the application of the drive signals DRV and the force-rebalance signals FRB, the pickoff signals PO are provided to the demodulator system 28. As an example, the pickoff signals PO can correspond to amplitude-modulated pickoff signals that are capacitively coupled to the drive electrodes 18 and/or the sense electrodes 20 in response to motion of the vibrating mass(es) 16. The pickoff signals PO can thus be demodulated via the demodulator system 28 to determine an appropriate magnitude of the respective drive signals DRV and/or force-rebalance signals FRB, such as to maintain the in-plane periodic oscillatory motion of the vibrating-mass(es) 16 and to maintain the vibrating-mass(es) 16 in the null position in the sense axis, respectively.

Thus, the processor 24 can calculate the magnitude of the force-rebalance signals FRB in a manner that is indicative of the rate of angular rotation of the sensor system 12 about the input axis. As an example, a magnitude of the force-rebalance signals FRB, and thus the electrostatic force, that is required to maintain the vibrating-mass(es) 16 at the null position along the sense axis can correspond to a rate of rotation of the sensor system 12 about the input axis. Therefore, the magnitude of the force-rebalance signals FRB can be implemented by the processor 24 to calculate the angular rotation of the sensor system 12 about the input axis. Accordingly, the gyroscope controller 14 can provide the measurement of the angular rate of rotation about the input axis as an output signal ROT.

As an example, fabrication and electronic variations can result in changes in the separation of the resonant frequencies of the drive axis and the sense axis of each of the vibrating-mass(es) 16 due to variation of spring stiffness and mass of the vibrating mass(es) 16. As a result of such frequency separation, a remodulation phase-error can couple quadrature effects into the sense axis, and thus affect the magnitude of the generated force-rebalance signal FRB. Because the magnitude of the force-rebalance signal FRB can correspond to rotation of the sensor system 12 about the input axis, such quadrature coupling can create errors in the calculation of the rate of rotation ROT about the input axis. Accordingly, the signal generator 26 is configured to generate the quadrature signal(s) QDR to provide a negative electrostatic spring force with respect to the quadrature electrodes 22 to substantially mitigate the quadrature motion, and thus the quadrature coupling into the force-rebalance signal FRB. As a result, the application of the quadrature signal(s) QDR with respect to the quadrature electrodes 22 can substantially mitigate quadrature-based errors in the calculation of the rate of rotation ROT about the input axis.

As an example, the quadrature signal(s) QDR can be DC signals having an amplitude that corresponds to a predetermined magnitude of the quadrature effects (e.g., the amount of error in the force-rebalance signal FRB due to quadrature effects). As an example, the amount of frequency mismatch between the principle elastic axes, and thus the magnitude of the quadrature effects, can be determined during fabrication of the vibrating-mass gyroscope system 10. Thus, the quadrature signal(s) QDR can correspond to one or more DC signals having an amplitude that is determined during testing of the vibrating-mass gyroscope system 10 to substantially mitigate quadrature effects. As another example, the processor 28 can be configured to calculate a magnitude of the quadrature effects in real time during operation of the vibrating-mass gyroscope system 10 based on the frequency mismatch between the principle elastic axes of the vibrating mass(es) 16, such as based on demodulating the pickoff signals PO. As a result, the vibrating-mass gyroscope system 10 can render the quadrature effects observable and can calculate a DC amplitude of the quadrature signal(s) QDR in real time to substantially mitigate the quadrature effects on the calculation of the rotation rate ROT.

Figure 2:
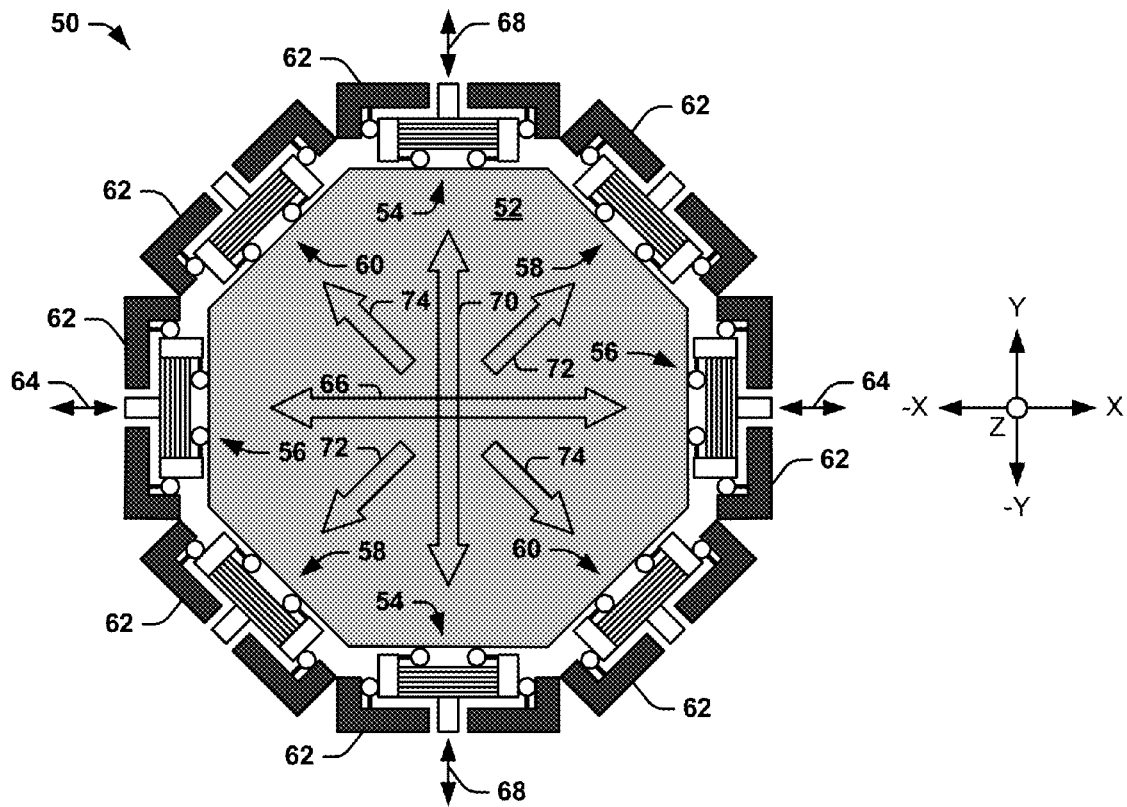
FIG. 2 illustrates an example of a sensor system.

FIG. 2 illustrates an example of a sensor system 50. The sensor system 50 is demonstrated in the example of FIG. 2 in an overhead view, such that the sensor system 50 can be configured as a substantially planar arrangement in the X-Y plane. The sensor system 50 can correspond to the sensor system 12 in the example of FIG. 1. Therefore, reference is to be made to the example of FIG. 1 in the following description of the example of FIG. 2.

The sensor system 50 includes a vibrating-mass 52 that is demonstrated in the example of FIG. 2 as having a substantially planar octagonal shape. As an example, the vibrating-mass 52 can be a layer of etched silicon. The vibrating-mass 52 is substantially surrounded by a plurality of electrode shuttles that are coupled to the vibrating-mass 52 at each of the eight sides of the periphery of the octagonal shape of the vibrating-mass 52. The electrode shuttles are demonstrated in the example of FIG. 2 as a first pair of electrode shuttles 54 arranged along the X-axis of the vibrating-mass 52, a second pair of electrode shuttles 56 arranged along the Y-axis of the vibrating-mass 52, a third pair of electrode shuttles 58 arranged along an axis 45° relative to the first and second pairs 54 and 56, and a fourth pair of electrode shuttles 60 arranged orthogonal with respect to the third pair of electrode shuttles 58. As an example, the electrode shuttles 54, 56, 58, and 60 can each be coupled to the vibrating-mass 52 via at least one spring and roller assembly. The electrode shuttles 54, 56, 58, and 60 are also each coupled to a frame portion 62 of the sensor system 50 that can substantially surround the vibrating-mass 52. Thus, the frame portion 62 can be in a substantially fixed position, such as part of or integral with a housing (e.g., substrate) of an associated integrated circuit (IC) chip in which the sensor system 50 can be included. Accordingly, as described herein, axial movement of the electrode shuttles 54 can translate into in-plane motion of the vibrating-mass 52 in the X-Y plane.

Figure 3:
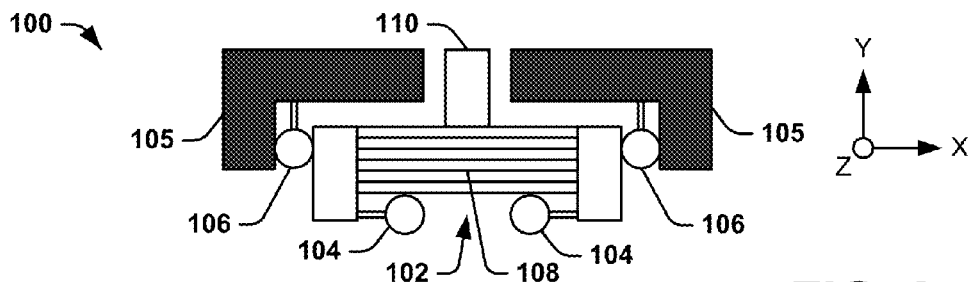
FIG. 3 illustrates an example of an electrode shuttle.

FIG. 3 illustrates an example of an electrode shuttle system 100. The electrode shuttle system 100 can correspond to an exploded view of a given one of the electrode shuttles 54, 56, 58, and/or 60 in the example of FIG. 2. Therefore, reference is to be made to the example of FIG. 2 in the following description of the example of FIG. 3. The electrode shuttle system 100 includes an electrode shuttle 102 that can correspond to any one of the electrode shuttles 54, 56, 58, and/or 60 in the sensor system 50. Therefore, each of the electrode shuttles 54, 56, 58, and 60 in the example of FIG. 2 can be configured substantially the same with respect to each other. Thus, each of the electrode shuttles 54, 56, 58, and/or 60 can include the components of the electrode shuttle 102 demonstrated in the example of FIG. 3.

In the example of FIG. 3, the electrode shuttle 102 includes a pair of spring and roller assemblies 104 that are coupled to the peripheral surface of a given one side of the octagonal shape of the vibrating-mass 52. As an example, the pair of spring and roller assemblies 104 can be configured as one-directional springs (e.g., as U-shaped folded beam flexures). The pair of spring and roller assemblies 104 can thus be configured to allow lateral movement of the vibrating-mass 52 relative to the orientation of the respective electrode shuttle 102 while still being attached to the vibrating-mass 52 to allow the electrode shuttle 102 to push/pull the vibrating-mass 52 in response to axial movement of the electrode shuttle 102. In the example of the orientation of the electrode shuttle 102, the pair of spring and roller assemblies 104 can be configured to allow lateral movement of the vibrating-mass 52 along the X-axis while still being attached to the vibrating-mass 52 to allow the electrode shuttle 102 to push/pull the vibrating-mass 52 in response to axial movement of the electrode shuttle 102 along the Y-axis. The electrode shuttle 102 is demonstrated as being coupled to a frame portion 105 (e.g., corresponding to the frame portion 62) via a pair of spring and roller assemblies 106 that allows the axial movement of the electrode shuttle 102 relative to the frame portion 105, demonstrated as along the Y-axis in the example of FIG. 3. As an example, similar to the pair of spring and roller assemblies 104, the pair of spring and roller assemblies 106 can be configured as one-directional springs (e.g., as U-shaped folded beam flexures).

The electrode shuttle 102 also includes a set of electrodes 108 that interconnect the spring and roller assemblies 104 and a piston portion 110. As an example, the piston portion 110 can be coupled to a lever (not shown) at a distal end, such as to couple the electrode shuttle 102 to an electrode shuttle associated with a separate vibrating-mass (e.g., via a lever), or can be uncoupled at a distal end. The electrodes 108 can be configured in a variety of ways to interact with corresponding electrodes (not shown) that are fixed to the frame portion 62, and thus provide for the axial movement of the electrode shuttle 102 based on an electrostatic force between the electrodes 108 and the corresponding electrodes with which the electrodes 108 interact. As an example, the electrodes 108 (e.g., as well as the corresponding electrodes with which the electrodes 108 interact) can be configured as a lateral comb-drive arrangement, a tooth-drive arrangement, a parallel-plate arrangement, or any of a variety of micro-electromechanical systems (MEMS) electrode arrangements that can generate an electric field and can be capacitively coupled with the corresponding electrodes with which the electrodes 108 interact. For example, one of the electrodes 108 and the corresponding electrodes can be held at a voltage potential (e.g., in response to a respective one of the drive signals DRV, the force-rebalance signals FRB, or the quadrature signals QDR), while the other of the electrodes 108 and the corresponding electrodes can be held at a low-voltage rail potential (e.g., ground). Therefore, an electrostatic force can be generated between the electrodes 108 and the corresponding electrodes to facilitate axial movement of the electrode shuttle 102.

Referring back to the example of FIG. 2, the drive signals DRV can be provided to the first pair of electrode shuttles 54 to provide alternating electrostatic forces between the electrodes (e.g., the electrodes 108) of the first pair of electrode shuttles 54 and electrodes coupled to the frame portion 62. Thus, the first pair of electrode shuttles 54 can move axially along the X-axis, demonstrated by arrows 64, to provide for single-axis periodic oscillatory movement of the vibrating-mass 52 along the X-axis, demonstrated by a large bi-directional arrow 66, corresponding to a drive axis. Similarly, the force-rebalance signals FRB can be provided to the second pair of electrode shuttles 56 to provide an electrostatic force between the electrodes (e.g., the electrodes 108) of the second pair of electrode shuttles 56 and electrodes coupled to the frame portion 62. Thus, the second pair of electrode shuttles 56 can move axially along the Y-axis, demonstrated by arrows 68, to provide single-axis force-rebalance of the vibrating-mass 52 (e.g., maintain the vibrating-mass 52 in the Y-axis null position) in response to movement of the vibrating-mass 52 along the Y-axis, demonstrated by a large bi-directional arrow 70, corresponding to a sense axis. Such movement of the vibrating-mass 52 can be based on rotation of the sensor system 50 about the Z-axis, and thus the force-rebalance of the vibrating-mass 52 can be indicative of the rate of rotation ROT of the sensor system 50 about the Z-axis based on an amplitude of the force-rebalance signals FRB. As a result, the pairs of electrode shuttles 54 and 56 can provide for in-plane motion of the vibrating-mass 52 in two-axes (e.g., the periodic motion in the X-axis and to maintain the null position in the Y-axis), based on the respective single-axis motion of the electrode shuttles 54 (e.g., along the X-axis) and the electrode shuttles 56 (e.g., along the Y-axis). It is to be understood that, while the drive axis is demonstrated as the X-axis and the sense axis is demonstrated as the Y-axis, the axial designations are arbitrary in that the drive axis and the sense axis can be any two orthogonal axes in the example of FIG. 2.

In addition, the quadrature signals QDR can be provided to at least one of the third and fourth pairs of electrode shuttles 58 and 60 (e.g., via the electrodes 108) to provide a quadrature force of the vibrating-mass 52 to provide stiffness of the in-plane movement of the vibrating-mass 52, and to thus substantially mitigate quadrature effects in the calculation of the rate of rotation ROT. As an example, a first quadrature signal $QDR_1$ can be provided to the third pair of electrode shuttles 58 (e.g., via the electrodes 108) at a first amplitude, such as equal with respect to each of the electrode shuttles 58, to provide substantially equal and opposite quadrature forces, demonstrated by large arrows 72, in a 45° axis between the X and Y-axes and a respective 45° axis between the −X and −Y-axes. Similarly, a second quadrature signal $QDR_2$ can be provided to the fourth pair of electrode shuttles 60 (e.g., via the electrodes 108) at a second amplitude that may be different from the first amplitude, such as equal with respect to each of the electrode shuttles 60, to provide substantially equal and opposite quadrature forces, demonstrated by large arrows 74, in a 45° axis between the X and −Y-axes and a respective 45° axis between the −X and Y-axes. The amplitude of the respective first and second quadrature signals $QDR_1$ and $QDR_2$ may be predetermined based on the magnitude of the quadrature effects (e.g., based on testing during fabrication or in real-time based on feedback) to provide sufficient stiffness in the in-plane motion of the vibrating-mass 52 to set the frequencies of the principle elastic axes to be approximately equal. Therefore, quadrature effects resulting from the mismatch in the frequencies of the principle elastic axes can be substantially mitigated in the calculation of the rate of rotation ROT of the vibrating-mass gyroscope system 10, such as to provide a more accurate navigation solution.

Figure 4:
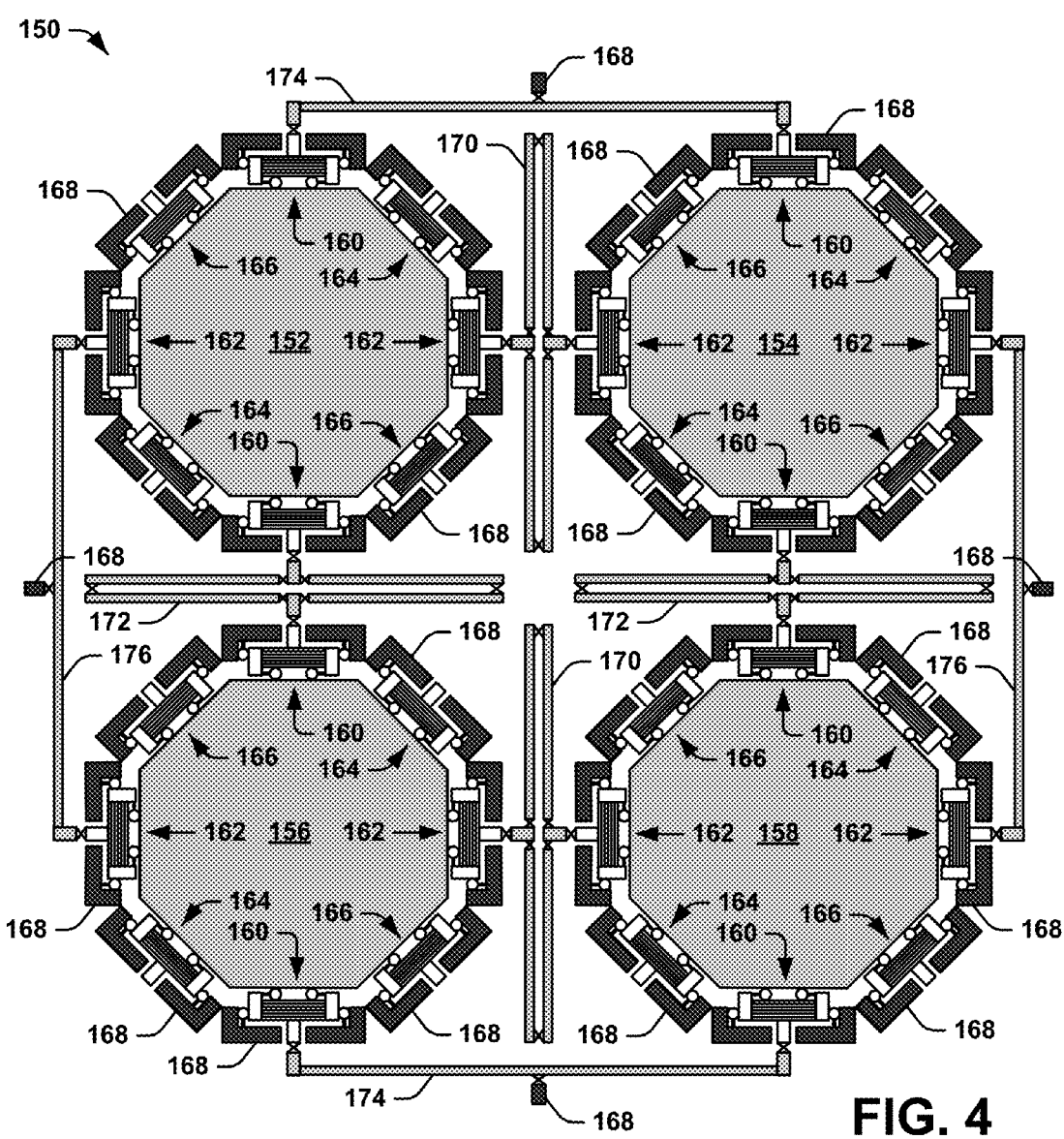
FIG. 4 illustrates another example of a sensor system.

FIG. 4 illustrates another example of a sensor system 150. The sensor system 150 is demonstrated in the example of FIG. 4 as a quad-mass sensor system that includes a first vibrating-mass 152, a second vibrating-mass 154, a third vibrating-mass 156, and a fourth vibrating-mass 158. Each of the vibrating-masses 152, 154, 156, and 158 can correspond to the vibrating-mass 52 in the example of FIG. 2. The sensor system 150 can correspond to the sensor system 12 in the example of FIG. 1. Therefore, reference is to be made to the examples of FIGS. 1 and 2 in the following description of the example of FIG. 4.

The sensor system 150 can be arranged in a substantially planar arrangement with respect to the vibrating-masses 152, 154, 156, and 158. In the example of FIG. 4, each of the vibrating-masses 152, 154, 156, and 158 is demonstrated as having a substantially planar octagonal shape. Each of the vibrating-masses 152, 154, 156, and 158 are substantially surrounded by a plurality of electrode shuttles that are coupled to the respective vibrating-masses 152, 154, 156, and 158 at each of the eight sides of the periphery of the octagonal shape of the respective vibrating-masses 152, 154, 156, and 158. The electrode shuttles are demonstrated in the example of FIG. 4 as a pair of drive electrode shuttles 160 arranged opposite each other with respect to each of the respective vibrating-masses 152, 154, 156, and 158, a pair of sense electrode shuttles 162 arranged opposite each other with respect to each of the respective vibrating-masses 152, 154, 156, and 158, a first pair of quadrature electrode shuttles 164 arranged opposite each other along an axis 45° relative to the first and second pairs 160 and 162, and a second pair of quadrature electrode shuttles 166 arranged orthogonal with respect to the third pair of electrode shuttles 164. The electrode shuttles 160, 162, 164, and 166 can thus correspond to the pairs of electrodes 54, 56, 58, and 60 in the example of FIG. 2.

As an example, the electrode shuttles 160, 162, 164, and 166 can each be coupled to the respective vibrating-masses 152, 154, 156, and 158 via at least one spring and roller assembly. The electrode shuttles 152, 154, 156, and 158 are also each coupled to a frame portion 168 of the sensor system 150 that can substantially surround the respective vibrating-masses 152, 154, 156, and 158. For example, each of the electrode shuttles 152, 154, 156, and 158 can be configured substantially similar to the electrode shuttle 102 in the example of FIG. 3. Thus, the frame portion 168 can be in a substantially fixed position, such as part of or integral with a housing (e.g., substrate) of an associated IC chip in which the sensor system 150 can be included. Accordingly, axial movement of the electrode shuttles 54 can translate into in-plane motion of the respective vibrating-masses 152, 154, 156, and 158 in the X-Y plane.

The drive signals DRV can be provided from the signal generator 26 as separate drive signals DRV to the pair of drive electrode shuttles 160 in each of the respective vibrating-masses 152, 154, 156, and 158 to provide alternating electrostatic forces to provide for periodic oscillatory movement of the respective vibrating-masses 152, 154, 156, and 158 along a drive axis. As an example, the drive axis can be substantially the same axis for each of the respective vibrating-masses 152, 154, 156, and 158. Similarly, the force-rebalance signals FRB can be provided from the signal generator 26 as separate force-rebalance signals FRB to the pair of sense electrode shuttles 162 in each of the respective vibrating-masses 152, 154, 156, and 158 to provide alternating electrostatic forces to provide force-rebalance of the respective vibrating-masses 152, 154, 156, and 158 in response to movement of the respective vibrating-masses 152, 154, 156, and 158 along the sense axis. Such movement of the respective vibrating-masses 152, 154, 156, and 158 can be based on rotation of the sensor system 150 about an input axis (e.g., orthogonal to both the drive and sense axes), and thus the force-rebalance of the respective vibrating-masses 152, 154, 156, and 158 can be indicative of the rate of rotation ROT of the sensor system 150 about the Z-axis based on an amplitude of the force-rebalance signals FRB.

In addition, the quadrature signals QDR can be provided from the signal generator 26 as separate quadrature signals $QDR_1$ and $QDR_2$ to the respective first and second pairs of quadrature electrode shuttles 164 and 166 in each of the respective vibrating-masses 152, 154, 156, and 158 to provide respective quadrature forces of the respective vibrating-masses 152, 154, 156, and 158 to substantially mitigate quadrature effects in the calculation of the rate of rotation ROT. As an example, based on separate fabrication and electrical tolerances associated with each of the respective vibrating-masses 152, 154, 156, and 158, the first and second quadrature signals $QDR_1$ and $QDR_2$ can be provided as DC signals with separate amplitudes with respect to each of the vibrating-masses 152, 154, 156, and 158. Therefore, each of the vibrating-masses 152, 154, 156, and 158 can be subjected to substantially equal and opposite quadrature forces along each of the orthogonal quadrature axes that are 45° offset from the drive and sense axes of each of the respective vibrating-masses 152, 154, 156, and 158. The amplitudes of the respective first and second quadrature signals $QDR_1$ and $QDR_2$ of each of the vibrating-masses 152, 154, 156, and 158 may be predetermined based on the magnitude of the quadrature effects to set the frequencies of the principle elastic axes of each of the respective vibrating-masses 152, 154, 156, and 158 to be approximately equal. Therefore, quadrature effects can be substantially mitigated in the calculation of the rate of rotation ROT of the associated vibrating-mass gyroscope system (e.g., the vibrating-mass gyroscope system 10).

In the example of FIG. 4, the vibrating-masses 152 and 154 and the vibrating-masses 156 and 158 are coupled via a respective one of the drive electrode shuttles 160 by respective lever assemblies 170. Similarly, the vibrating-masses 152 and 156 and the vibrating-masses 154 and 158 are coupled via a respective one of the sense electrode shuttles 162 by respective lever assemblies 172. Additionally, the vibrating-masses 152 and 154 and the vibrating-masses 156 and 158 are coupled via a respective one of the sense electrode shuttles 162 by respective lever-anchor assemblies 174. Similarly, the vibrating-masses 152 and 156 and the vibrating-masses 154 and 158 are coupled via a respective one of the drive electrode shuttles 160 by respective lever-anchor assemblies 176. The lever assemblies 170 and 172 and the lever-anchor assemblies 174 and 176 can thus translate motion between the vibrating-masses 152, 154, 156, and 158 to maintain a substantially equal frequency in the in-plane periodic motion and force-rebalance of the vibrating-masses 152, 154, 156, and 158, such as in response to the drive signals DRV and a rotation about the sensitive axis of the sensor system 150. Similarly, the lever-anchor assemblies 174 and 176 are each coupled to the frame portion 168, and thus provide stability with respect to the coupled vibrating-masses 152, 154, 156, and 158. Accordingly, the lever assemblies 170 and 172 and the lever-anchor assemblies 174 and 176 can facilitate relational movement of the in-plane motion of the coupled vibrating-masses 152, 154, 156, and 158.

Figure 5:
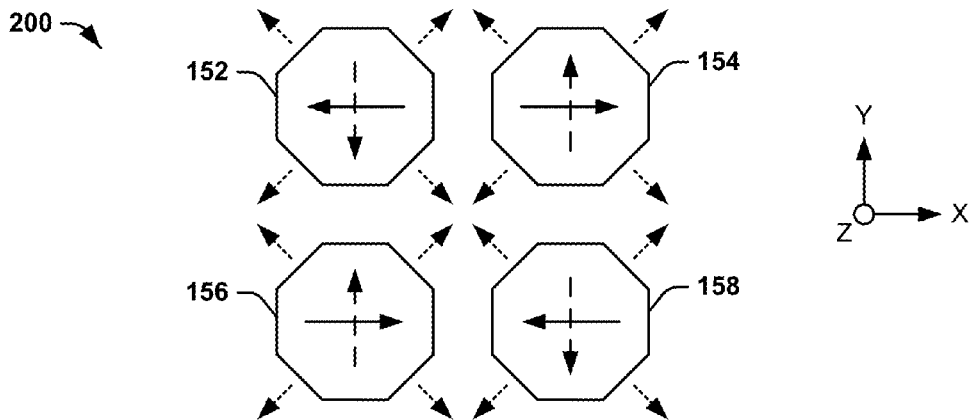
FIG. 5 illustrates an example of periodic motion of a sensor system.

FIG. 5 illustrates an example diagram 200 of the sensor system 150. The diagram 200 demonstrates the respective motion of the vibrating-masses 152, 154, 156, and 158 in response to the drive signals DRV, the force-rebalance signals FRB, and the quadrature signals QDR, and is thus demonstrated in a more simplified manner relative to the sensor system 150 in the example of FIG. 4. Therefore, reference is to be made to the example of FIG. 4 in the following description of the example of FIG. 5.

The sensor system 150 includes the first vibrating-mass 152, the second vibrating-mass 154, the third vibrating-mass 156, and the fourth vibrating-mass 158 that are arranged in pairs. In the example of FIG. 5, the first vibrating-mass 152 and the second vibrating-mass 154 are a first pair of vibrating-masses that are arranged substantially the same but implement motion in opposite directions with respect to each other, and the third vibrating-mass 156 and the fourth vibrating-mass 158 are a second pair of vibrating-masses that are arranged substantially the same but implement motion in opposite directions with respect to each other and 180° out-of-phase with the first and second vibrating masses 152 and 154.

In response to one or two respective drive signals DRV, the first and second vibrating-masses 152 and 154 can be configured to move in an in-plane periodic oscillatory manner in opposite directions along the drive axis, demonstrated in the example of FIG. 5 as the X-axis, at a given time, such as 180° out-of-phase with respect to each other. Additionally, in response to one or two respective force-rebalance signals FRB, the first and second vibrating-masses 152 and 154 can be configured to maintain a null position along the sense axis, demonstrated in the example of FIG. 5 as the Y-axis, based on an electrostatic force that is applied in opposite directions at a given time, such as 180° out-of-phase with respect to each other. In the example of FIG. 5, the in-plane periodic motion of the first and second vibrating-masses 152 and 154 is demonstrated with a solid arrow, while the force-rebalance motion of the first and second vibrating-masses 152 and 154 is demonstrated with a dashed arrow.

Similarly, in response to the drive signal(s) DRV, the third and fourth vibrating-masses 156 and 158 can be configured to move in the in-plane periodic oscillatory manner in opposite directions along the drive axis at a given time, such as 180° out-of-phase with respect to each other. Additionally, in response to one or two respective force-rebalance signals FRB, the third and fourth vibrating-masses 156 and 158 can be configured to maintain a null position along the sense axis based on an electrostatic force that is applied in opposite directions at a given time, such as 180° out-of-phase with respect to each other. Similar to as described previously, the in-plane periodic motion and the force-rebalance motion of the third and fourth vibrating-masses 156 and 158 is demonstrated with a solid arrow and a dashed arrow, respectively. Thus, the first vibrating-mass 152 is in-phase with the fourth vibrating-mass 158 and out-of-phase with respect to the second and third vibrating-masses 154 and 156, and the second vibrating-mass 154 is in-phase with the third vibrating-mass 156 and out-of-phase with respect to the first and fourth vibrating-masses 152 and 158. Accordingly, based on the opposing motion of the vibrating-masses 152, 154, 156, and 158, the sensor system 150 can be substantially balanced about the input axis passing through an approximate center of the sensor system 150 at a given time.

In addition, in response to one or two respective quadrature signals QRD for each of the vibrating-masses 152, 154, 156, and 158, each of the vibrating-masses 152, 154, 156, and 158 are subject to a quadrature force, demonstrated in the example of FIG. 5 as a dotted arrow, that extends outward from each of the vibrating-masses 152, 154, 156, and 158 in a 45° offset relative to the drive and sense axes of each of the vibrating-masses 152, 154, 156, and 158. Because of varying fabrication and electrical tolerances of each of the vibrating-masses 152, 154, 156, and 158, the magnitude of the quadrature effects can vary amongst the vibrating-masses 152, 154, 156, and 158. Therefore, the magnitude (e.g., DC magnitude) of the respective quadrature signal(s) QDR provided to each of the vibrating-masses 152, 154, 156, and 158 can likewise vary to provide sufficient stiffness of the in-plane motion of the vibrating-masses 152, 154, 156, and 158 (e.g., along both the respective drive and force-rebalance axes). For example, the amplitude of the respective quadrature signal(s) QDR provided to each of the vibrating-masses 152, 154, 156, and 158 can be determined at a fabrication testing phase of the vibrating-mass gyroscope system 10, or in real-time via feedback (e.g., via the pickoff signals PO). Therefore, the sufficient stiffness of the in-plane motion of the vibrating-masses 152, 154, 1565, and 158 can substantially mitigate quadrature effects in generation of the force-rebalance signal(s) FRB, and thus the calculation of the rate of rotation ROT of the respective vibrating-mass gyroscope system 10.

In addition to the periodic motion and operation of the diagram 200 of the sensor system 150, the sensor system 150 can also be configured to implement self-calibration procedures based on the motion of the vibrating-masses 152, 154, 156, and 158. For example, the sensor system 150 can be configured to implement a first calibration procedure based on switching the respective drive and sense axes. As an example, during a first duration of time, the sensor system 150 can be configured to provide the periodic motion of the vibrating-masses 152, 154, 156, and 158 along the X-axis corresponding to the drive axis in response to the drive signals DRV, such that the sensor system 150 can be configured to maintain the null position of the vibrating-masses 152, 154, 156, and 158 along the Y-axis corresponding to the sense axis in response to the force-rebalance signals FRB. Subsequently, the sensor system 150 can switch to a second duration of time during which the sensor system 150 can be configured to provide the periodic motion of the vibrating-masses 152, 154, 156, and 158 along the Y-axis corresponding to the drive axis in response to the drive signals DRV, and during which the sensor system 150 can be configured to maintain the null position of the vibrating-masses 152, 154, 156, and 158 along the X-axis corresponding to the sense axis in response to the force-rebalance signals FRB. Thus, the drive signals DRV and the force-rebalance signals FRB are applied to alternating sets of the electrode shuttles 160 and 162 in each of the first and second time durations.

As another example, the sensor system 150 can be configured to implement a second calibration procedure based on pattern angle modulation, such that the drive axis, the sense axis, and the quadrature axes are rotated around each of the vibrating-masses 152, 154, 156, and 158 in succession. As an example, the sensor system 150 can be configured to provide the periodic motion of the vibrating-masses 152, 154, 156, and 158 along the X-axis and to maintain the null position of the vibrating-masses 152, 154, 156, and 158 along the Y-axis during a first duration, similar to as described previously. Subsequently, the sensor system 150 can switch to subsequent durations of time at which each of the drive axis, the sense axis, and the quadrature axes of each of the vibrating-masses 152, 154, 156, and 158 rotates 45° around the respective vibrating-masses 152, 154, 156, and 158. Upon rotation of the drive axis, the sense axis, and the quadrature axes of each of the respective vibrating-masses 152, 154, 156, and 158, respective forces resulting from the drive signals DRV, the force-rebalance signals FRB, and the quadrature signals QRD can be applied in opposite directions for each oppositely disposed one of the vibrating-masses 152, 154, 156, and 158, such that the periodic oscillation of the drive axis arranged along an XY-axis (e.g., 45° with respect to each of the X and Y-axes) provides for the vibrating-masses 152 and 158 moving away from each other while the vibrating-masses 154 and 156 moving toward each other, and vice versa.

As a result of the self-calibration procedures (e.g., the first and second self-calibration procedures described herein), the processor 24 can be configured to calibrate the sensor system 150, such as to mitigate bias and/or scale-factor errors. For example, the processor 24 can be configured to obtain a sequential series of measurements of the force-rebalance signals FRB in each of the different sense axes as the sense axis changes in each of the durations of time. Because the different sense axes have a defined relationship with respect to the each other and the respective drive axes, bias and/or scale-factor errors can be identified in the amplitudes of the force-rebalance signals FRB over the measurement periods of each of the separate time durations. Therefore, the bias and/or scale-factor errors can be rendered observable over a cycle of the changes between the time durations. Accordingly, the amplitudes of the force-rebalance signals FRB over the separate time durations can be implemented to substantially continuously calibrate the sensor system 150 based on rendering the bias and/or scale-factor errors observable and canceling the errors from the measured amplitudes of the force-rebalance signals FRB in calculating the rotation of the sensor system 150 about the input axis.

Figure 6:
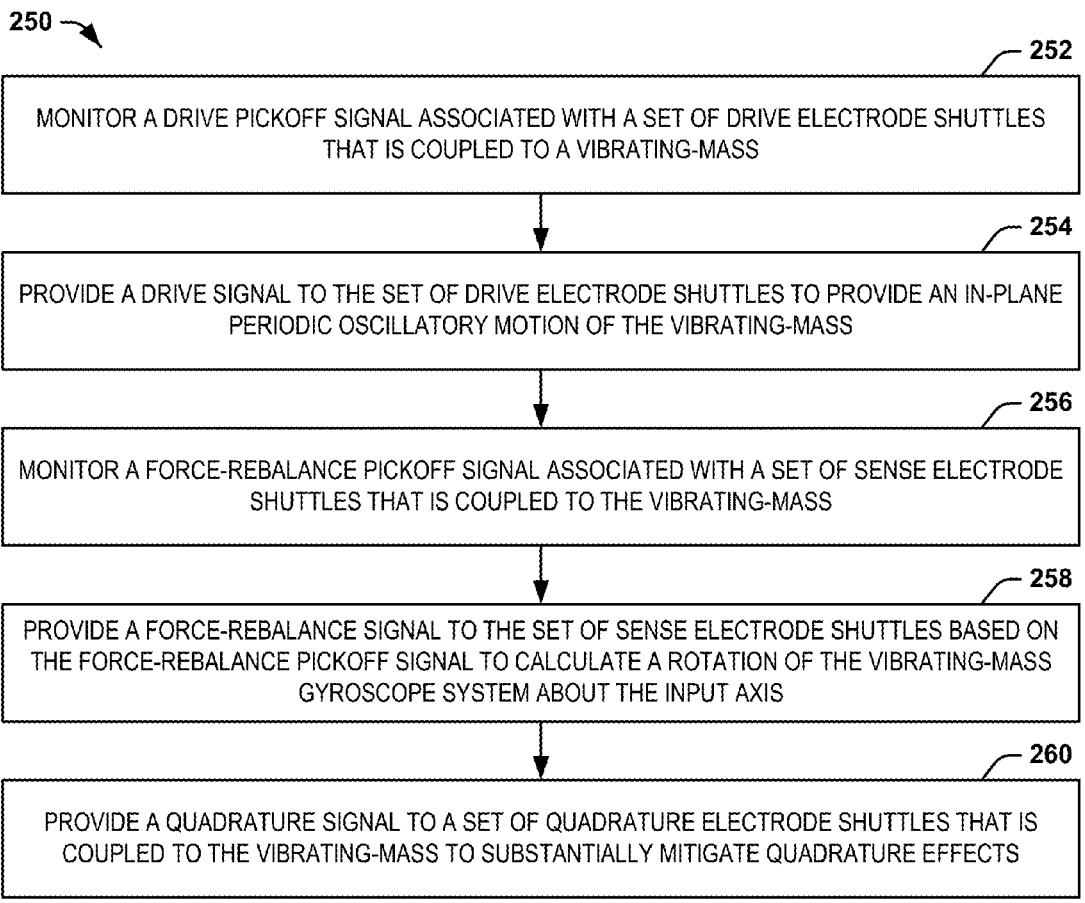
FIG. 6 illustrates an example of a method for calculating rotation about an input axis in a vibrating-mass gyroscope system.

In view of the foregoing structural and functional features described above, a methodology in accordance with various aspects of the present invention will be better appreciated with reference to FIG. 6. While, for purposes of simplicity of explanation, the methodology of FIG. 6 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention.

FIG. 6 illustrates an example of a method 250 for calculating rotation about an input axis in a vibrating-mass gyroscope system (e.g., the vibrating-mass gyroscope system 10). At 252, a drive pickoff signal (e.g., the pickoff signals PO) associated with a set of drive electrode shuttles (e.g., the drive electrodes 18) that is coupled to a vibrating-mass (e.g., the vibrating-mass 16) is monitored. At 254, a drive signal (e.g., the drive signals DRV) is provided to the set of drive electrode shuttles to provide an in-plane periodic oscillatory motion of the vibrating-mass. At 256, a force-rebalance pickoff signal (e.g., the pickoff signals PO) associated with a set of sense electrode shuttles (e.g., the sense electrodes 20) that is coupled to the vibrating-mass is monitored. At 258, a force-rebalance signal (e.g., the force-rebalance signal FRB) is provided to the set of sense electrode shuttles based on the force-rebalance pickoff signal to calculate a rotation of the vibrating-mass gyroscope system about the input axis (e.g., the calculated rate of rotation ROT). At 260, a quadrature signal (e.g., the quadrature signals QDR) is provided to a set of quadrature electrode shuttles (e.g., the quadrature electrodes 22) that is coupled to the vibrating-mass to substantially mitigate quadrature effects.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A vibrating-mass gyroscope system comprising:
   a sensor system comprising a vibrating-mass and a plurality of electrodes coupled to the vibrating-mass that are configured to facilitate in-plane motion of the vibrating-mass; and
   a gyroscope controller configured to generate:
      a drive signal that is provided to a first set of the plurality of electrodes to provide an in-plane periodic oscillatory motion of the vibrating-mass along a drive axis in response to a drive axis force along the drive axis generated in response to the drive signal,
      a force-rebalance signal that is provided to a second set of the plurality of electrodes to calculate a rotation of the vibrating-mass gyroscope system about an input axis, the force-rebalance signal being configured to generate a force-rebalance force along a second axis that is orthogonal to the drive axis, and
      a quadrature signal that is provided to a third set of the plurality of electrodes to generate a quadrature force along a third axis that is arranged at approximately 45° relative to the drive axis and the second axis to substantially mitigate quadrature effects associated with the vibrating-mass.

2. The system of claim 1, wherein the vibrating-mass is configured in a substantially planar octagonal shape, wherein the plurality of electrodes comprises eight electrode shuttles that are each arranged, respectively, at a respective one of the sides of the periphery of the substantially planar octagonal shape to pull the vibrating-mass along a respective single-axis in respective directions orthogonal with the eight sides of the periphery of the substantially planar octagonal shape.

3. The system of claim 1, wherein the quadrature signal comprises a first quadrature signal and a second quadrature signal, wherein the third set of the plurality of electrodes comprises:
   a first pair of quadrature electrode arrangements that are arranged opposite each other with respect to the vibrating-mass and which are each configured to receive the first quadrature signal; and
   a second pair of quadrature electrode arrangements that are arranged opposite each other with respect to the vibrating-mass and orthogonally with respect to the first pair of quadrature electrode arrangements and which are each configured to receive the second quadrature signal.

4. The system of claim 1, wherein the gyroscope controller is further configured to calculate a magnitude of the quadrature effects based on a frequency of the in-plane motion of the vibrating-mass, and is further configured to set an amplitude of the quadrature signal to substantially mitigate the quadrature effects in a feedback manner based on the magnitude of the quadrature effects.

5. The system of claim 1, wherein the quadrature signal is a DC signal having a predetermined amplitude that corresponds to an electrostatic force sufficient to substantially mitigate the quadrature effects associated with the vibrating-mass.

6. The system of claim 1, wherein the sensor system comprises:
   a plurality of vibrating-masses arranged in pairs and configured in a substantially planar arrangement with respect to each other; and
   a plurality of electrodes coupled to each of the plurality of vibrating-masses that are configured to facilitate in-plane motion of each of the plurality of vibrating-masses.

7. The system of claim 6, wherein the gyroscope controller is configured to generate the drive signal to provide for the in-plane periodic oscillatory motion of each of the plurality of vibrating-masses in a manner that is out-of-phase by 180° with respect to a given pair, and wherein the gyroscope controller is configured to generate the force-rebalance signal to generate a force-rebalance force in alternate and opposite directions for each of the plurality of vibrating-masses with respect to a given pair.

8. The system of claim 6, wherein the plurality of electrodes comprises a plurality of electrode shuttles, wherein at least one of the plurality of electrode shuttles of each of the plurality of vibrating-masses is coupled to at least one of the plurality of electrode shuttles of at least one of the remaining plurality of vibrating-masses via a spring flexure.

9. The system of claim 6, wherein the gyroscope controller is configured to provide drive signals to each of the plurality of vibrating masses along a respective drive axis to provide the in-plane periodic oscillatory motion of the respective plurality of vibrating-masses, to provide force-rebalance signals to provide a force-rebalance force along a respective sense-axis of the respective plurality of vibrating-masses, and to provide quadrature signals to each of the plurality of vibrating masses to provide quadrature forces along respective quadrature axes of the respective plurality of vibrating-masses, wherein the gyroscope controller is further configured to implement a self-calibration procedure of the sensor system based on periodically switching at least two of the drive axis, the sense axis, and the quadrature axes of each of the plurality of vibrating-masses in each of separate time durations.

10. A vibrating-mass gyroscope system comprising:
    a sensor system comprising a plurality of vibrating-masses and a respective plurality of sets of electrodes respectively coupled to each of the plurality of vibrating-masses, each of the plurality of sets of electrodes being configured to facilitate in-plane motion of a respective one of the plurality of vibrating-masses; and
    a gyroscope controller configured to generate:
        drive signals that are provided to drive electrodes of each of the plurality of sets of electrodes to provide an in-plane periodic oscillatory motion of the respective plurality of vibrating-masses along a drive axis in response to a drive axis force along the drive axis of each of the plurality of vibrating-masses generated in response to the drive signals,
        force-rebalance signals that are provided to sense electrodes of each of the plurality of sets of electrodes to calculate a rotation of the vibrating-mass gyroscope system about an input axis, the force-rebalance signals being configured to generate a force-rebalance force along a second axis of each of the plurality of vibrating-masses that is orthogonal to the respective drive axis, and
        quadrature signals that are provided to quadrature electrodes of each of the plurality of sets of electrodes to generate a quadrature force along a third axis of each of the plurality of vibrating-masses that is arranged at approximately 45° relative to the respective drive axis and the second axis to substantially mitigate quadrature effects associated with the respective plurality of vibrating-masses.

11. The system of claim 10, wherein each of the plurality of vibrating-masses are configured in a substantially planar octagonal shape, wherein each of the plurality of sets of electrodes comprises eight electrode shuttles that are each arranged, respectively, at a respective one of the sides of the periphery of the substantially planar octagonal shape of each of the plurality of vibrating-masses to pull the respective one of the plurality of vibrating-masses along a respective single-axis in respective directions orthogonal with the eight sides of the periphery of the substantially planar octagonal shape.

12. The system of claim 10, wherein the gyroscope controller is configured to generate the drive signals to provide for the in-plane periodic oscillatory motion of each of the plurality of substantially planar vibrating-masses in a manner that is out-of-phase by 180° with respect to a given pair of the plurality of vibrating-masses, and wherein the gyroscope controller is configured to generate the force-rebalance signal to generate a force-rebalance force in alternate and opposite directions for each of the plurality of substantially planar vibrating-masses with respect to a given pair.

\* \* \* \* \*